United States Patent
Cho et al.

(10) Patent No.: US 8,111,915 B2
(45) Date of Patent: Feb. 7, 2012

(54) APPARATUS AND METHOD OF ENHANCING COLOR OF IMAGE

(75) Inventors: Yang Ho Cho, Hwaseong-si (KR); Ho Young Lee, Suwon-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1140 days.

(21) Appl. No.: 11/877,884

(22) Filed: Oct. 24, 2007

(65) Prior Publication Data

US 2009/0022395 A1    Jan. 22, 2009

(30) Foreign Application Priority Data

Jul. 20, 2007 (KR) .................... 10-2007-0072735

(51) Int. Cl.
*G06K 9/00* (2006.01)
*G06K 9/40* (2006.01)
(52) U.S. Cl. ......... 382/167; 382/162; 382/254; 382/274
(58) Field of Classification Search .................. 382/162, 382/167, 254, 274
See application file for complete search history.

(56) References Cited

U.S. PATENT DOCUMENTS

| | | | | |
|---|---|---|---|---|
| 5,450,217 A | * | 9/1995 | Eschbach et al. | 358/518 |
| 6,823,083 B1 | * | 11/2004 | Watanabe et al. | 382/167 |
| 8,009,905 B2 | * | 8/2011 | Choe et al. | 382/167 |
| 2002/0114513 A1 | * | 8/2002 | Hirao | 382/167 |
| 2008/0137946 A1 | * | 6/2008 | Choe et al. | 382/167 |

* cited by examiner

*Primary Examiner* — Bernard Krasnic
(74) *Attorney, Agent, or Firm* — Staas & Halsey LLP

(57) ABSTRACT

An apparatus and method of enhancing color of image is provided. The apparatus for enhancing color of image including: a saturation enhancement unit to enhance a saturation of an input image using a saturation variation according to a brightness feature of the input image; a gray scale area protection unit to determine a final saturation variation depending on a saturation value of the input image and the saturation variation, and to prevent a saturation enhancement of a gray scale area; a color control unit to control a color of the input image using a color variation according to the brightness feature of the input image; and a brightness value correction unit to correct a difference between a resultant brightness value and an input brightness value of the input image, the resultant brightness value being generated by applying the final saturation variation and the color variation to the input image.

33 Claims, 7 Drawing Sheets

APPARATUS AND METHOD OF ENHANCING COLOR OF IMAGE

CROSS-REFERENCE TO RELATED APPLICATION

This application claims the benefit of Korean Patent Application No. 2007-72735, filed in the Korean Intellectual Property Office on Jul. 20, 2007, the disclosure of which is incorporated herein by reference.

BACKGROUND OF THE INVENTION

1. Field of the Invention

Aspects of the present invention relate to an apparatus and method of enhancing color of image, and more particularly, to an apparatus and method of enhancing color of image which controls a saturation and color of image.

2. Description of the Related Art

Currently, there are various devices for collecting and obtaining images such as video cameras, digital cameras, and scanners, and devices for outputting images such as displays, printers, and the like. However, such devices cannot produce realistic colors, and thus apparatuses for enhancing colors are developed.

However, in a conventional art, since apparatuses for enhancing colors enhances colors of input images considering overall features of input images, apparatus for enhancing colors cannot be completely effective with respect to images having partial features.

Also, in a conventional art, apparatuses for enhancing colors cannot overcome brightness changes generated during color enhancing process.

Also, noise can be generated through color enhancing process with respect to particular portions of input image. For example, for gray color having low saturation, color noises can be increased through a color enhancing process.

Also, when enhancing colors and the nature of human visual perception is not considered, results can seem odd to a human even though colors are enhanced.

Thus, an apparatus for enhancing a color of image is needed to generate a high quality image being preferred when viewed by humans.

SUMMARY OF THE INVENTION

Aspects of the present invention provide an apparatus and method of enhancing color of image which enhances a saturation depending on an average brightness value and a brightness value for each pixel of image, and thereby can take into account an entire feature and local feature of the image.

Aspects of the present invention also provide an apparatus and method of enhancing color of image which controls a color depending on brightness value for each pixel, and thereby can maintain a color consistency.

Aspects of the present invention also provide an apparatus and method of enhancing color of image which prevents a saturation increase of a gray scale area having low saturation, and thereby can reduce generation of low gradation noise.

Aspects of the present invention also provide an apparatus and method of enhancing color of image which corrects a brightness value which is generated by a saturation enhancement and color control, and thereby can precisely control only targeted saturation and color.

According to an aspect of the present invention, there is provided an apparatus for enhancing color of image, including: a saturation enhancement unit to enhance a saturation of an input image using a saturation variation according to a brightness feature of the input image; a gray scale area protection unit to determine a final saturation variation depending on a saturation value of the input image and the saturation variation, and to prevent a saturation enhancement of a gray scale area; a color control unit to control a color of the input image using a color variation according to the brightness feature of the input image; and a brightness value correction unit to correct a difference between a resultant brightness value and an input brightness value of the input image, the resultant brightness value being generated by applying the final saturation variation and the color variation to the input image.

According to another aspect of the present invention, there is provided a method of enhancing color of image, including: enhancing a saturation of an input image using a saturation variation according to a brightness feature of the input image; determining a final saturation variation depending on a saturation value of the input image and the saturation variation and preventing a saturation enhancement of a gray scale area; controlling a color of the input image using a color variation according to the brightness feature of the input image; and correcting a difference between a resultant brightness value and an input brightness value of the input image, the resultant brightness value being generated by applying the final saturation variation and the color variation to the input image.

Additional aspects and/or advantages of the invention will be set forth in part in the description which follows and, in part, will be obvious from the description, or can be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
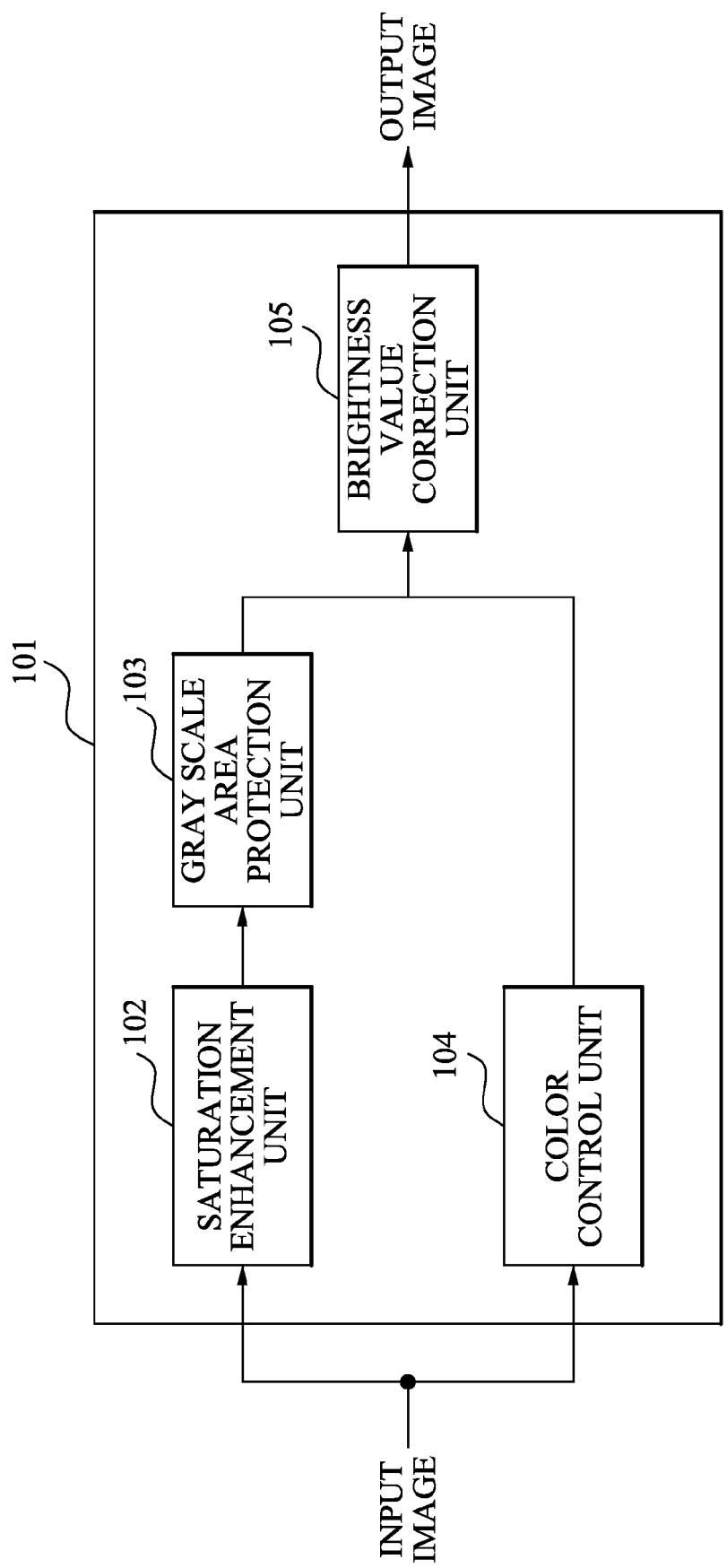
FIG. 1 illustrates an apparatus for enhancing color of image according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 illustrates an apparatus for enhancing color of image according to an embodiment of the present invention.

Referring to FIG. 1, the apparatus 101 for enhancing color of image includes a saturation enhancement unit 102, a gray scale area protection unit 103, a color control unit 104, and a brightness value correction unit 105.

The saturation enhancement unit 102 can enhance a saturation of an input image using a saturation variation according to a brightness feature of the input image. In this instance, the input image can be a red, green, blue (RGB) signal.

To use the brightness feature of the input image, the RGB signal needs to be converted into a hue, saturation, value (HSV) signal. Because an input image converted into a HSV color coordinate value can be easily embodied in hardware, and a brightness feature of an input image of an RGB coordinate value can not be easily determined. An operation of converting the RGB signal to the HSV signal is described with reference to FIG. 2.

The saturation enhancement unit 102 can decrease a saturation enhancement with respect to an image, which is generally dark, to prevent a generation of a color noise resulting in an unnatural image, and to prevent amplifying low gradation noise. Conversely, the saturation enhancement unit 102 can increase the saturation enhancement with respect to an image, which is generally bright, to generate an image in which a human visual perception is considered.

The saturation enhancement unit 102 can enhance the saturation of the input image using an average brightness value of the entire input image and a brightness value for each pixel of the input image. The average brightness value and the brightness value for each pixel of the input image are the brightness feature of the input image. That is, the saturation enhancement unit 102 can enhance the saturation of the input image using the saturation variation according to the brightness feature of the input image.

In this instance, the saturation enhancement unit 102 can calculate the saturation variation depending on the average brightness value of the input image and the saturation variation depending on the brightness value for each pixel of the input image. Here, the saturation variation depending on the average brightness value of the input image can be calculated using the saturation value of the input image and a saturation enhancement gain value depending on the average brightness value of the input image. Also, the saturation variation depending on the brightness value for each pixel can be calculated using the saturation value of the input image and a saturation enhancement gain value depending on the brightness value for each pixel of the input image.

In this instance, the saturation enhancement gain value depending on the average brightness value can be determined as an output value using a saturation variation gain curve according to a saturation variation function. The output value corresponds to an input value which is an average brightness value of a current frame.

The saturation enhancement gain value depending on the average brightness value can be determined using a sampled look up table (LUT) between predetermined threshold values in the saturation variation gain curve. Here, the saturation variation gain curve can vary according to variables which are externally set. Also, the saturation enhancement gain value depending on the brightness value for each pixel can be determined in a same way as the above-described method of determining the saturation enhancement gain value depending on the average brightness value.

An operation of enhancing the saturation of the input image using the brightness value for each pixel and the average brightness value is described in detail with reference to FIGS. 2 and 3.

The gray scale area protection unit 103 can prevent a saturation enhancement of a gray scale area. The gray scale area has a low saturation. The saturation enhancement unit 102 can apply the saturation enhancement when a brightness of an image is greater than a predetermined value. However, when the saturation enhancement is applied with respect to a gray scale area which has a low saturation and is bright, image quality can be deteriorated.

According to the present embodiment of the present invention, the gray scale area protection unit 103 can set a potential gray scale area where the saturation enhancement is not applied. When RGB values of the input image are identical, a corresponding pixel value undoubtedly corresponds to a gray scale value. For example, when RGB values of the input image are (200, 200, 200), the RGB values are identical. In this instance, when a color space conversion to a HSV color coordinate value is performed with respect to the corresponding pixel value, a saturation value S becomes 0. Since the saturation value is 0, the color noise cannot generate.

However, when the RGB values of the input image are slightly different, a minute saturation value exists even though the potential gray scale area is visually recognized as a gray scale area. The gray scale area protection unit 103 can control an area having the above-described RGB value as the potential gray scale area. A range of the potential gray scale area can be controlled according to the input image, a condition of system, and the like.

When an image is obtained by a color input device, a uniform gray scale pixel value can not be obtained due to noise generated by an image acquisition device. In this instance, when the saturation enhancement is applied to a gray scale area including minute noise, a noise element, which is not recognized before the saturation enhancement is applied, can be amplified, and thus the color noise can be generated.

Accordingly, the gray scale area protection unit 103 can prevent the saturation enhancement with respect to the gray scale area as described above. In this instance, the gray scale area protection unit 103 can determine a final saturation variation based on the saturation value of the input image and the saturation variation determined by the saturation enhancement unit 102. An operation of preventing the saturation enhancement by the gray scale area protection unit 103 is described in detail with reference to FIGS. 2 and 5.

The color control unit 104 can control a color of the input image using a color variation according to the brightness feature of the input image.

As described above, the brightness feature of the input image can be obtained by converting the input image with an RGB value into the input image with an HSV value. In this instance, the color control unit 104 can control the color of the input image using the brightness value for each pixel. The brightness value for each pixel is the brightness feature of the input image.

In this instance, the color control unit 104 can control the color by applying a method of determining the saturation variation depending on the brightness value for each pixel of the input image as described above. Specifically, a color variation depending on the brightness value for each pixel of the input image can be calculated using a color value of the input image and a color control gain value depending on the brightness value for each pixel of the input image.

An operation of controlling the color by the color control unit 104 is described in detail with reference to FIG. 2.

The brightness value correction unit 105 can correct a difference between a resultant brightness value and an input brightness value of the input image. Here, the resultant brightness value can be a brightness value where the final saturation variation and the color control gain value are applied. The final saturation variation is determined by the saturation enhancement unit 102 and the gray scale area protection unit 103, and the color control gain value is determined by the color control unit 104.

A brightness value of the image enhanced by the saturation enhancement unit 102 and the color control unit 104 can be additionally changed. Accordingly, the brightness value correction unit 105 can correct the additionally changed brightness value.

The saturation enhancement and the color control are performed in a HSV color space, and thus the brightness value of the input image is changed. As described above, since a conversion relationship between the HSV color space and an RGB color space is linear, a hardware embodiment can be easily realized, and a conversion process can be easily performed.

However, a relationship between the HSV color space and the human visual perception is not linear. Accordingly, even though only saturation and hue vary in HSV color space, the brightness value which is finally recognized can be changed.

Accordingly, the brightness value correction unit 105 can provide an output image by correcting the difference between the changed brightness value and the input brightness value. An operation of correcting the difference is described in detail with reference to FIG. 6.

Also, the brightness value correction unit 105 can use a brightness value Y of a YCbCr color space in which the human visual perception is considered in comparison to the HSV color space. An operation of converting the resultant brightness value through the saturation enhancement and color enhancement into a YCbCr value is needed, which is described in detail with reference to FIG. 2.

Figure 2:
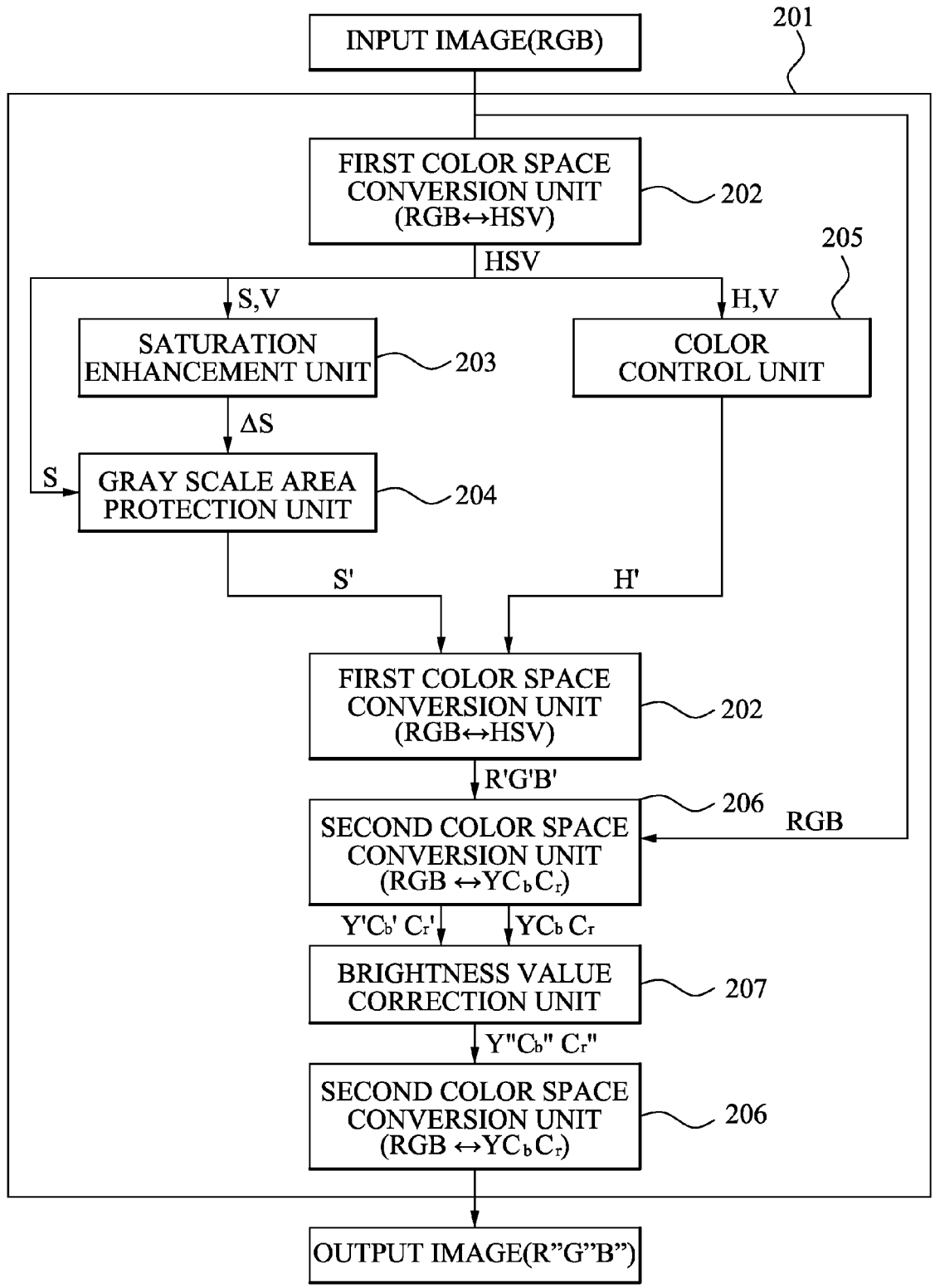
FIG. 2 illustrates a detailed operation of an apparatus for enhancing color of image according to an embodiment of the present invention.

FIG. 2 illustrates a detailed operation of an apparatus for enhancing color of image according to an embodiment of the present invention.

Referring to FIG. 2, the apparatus 201 for enhancing color of image includes a first color space conversion unit 202, a saturation enhancement unit 203, a gray scale area protection unit 204, a color control unit 205, a second color space conversion unit 206, and a brightness value correction unit 207.

The first color space conversion unit 202 can perform a color space conversion between an RGB value and a HSV value. The first color space conversion unit 202 can convert an input image with an RGB value into an input image with an HSV value to enhance the color of image.

The first color space conversion unit 202 can define a maximum value of the RGB values of the input image as MAX, and a minimum value of the RGB values of the input image as MIN. Also, an operation of converting the RGB value of the input image into a HSV color signal can be represented as Equation 1.

$$H = \begin{cases} 60 \times \frac{G-B}{MAX-MIN} + 0°, \text{ if } MAX = R \text{ and } G \geq B \\ 60 \times \frac{G-B}{MAX-MIN} + 360°, \text{ if } MAX = R \text{ and } G < B \\ 60 \times \frac{B-R}{MAX-MIN} + 120°, \text{ if } MAX = G \\ 60 \times \frac{R-G}{MAX-MIN} + 240°, \text{ if } MAX = B \end{cases}$$

[Equation 1]

$$S = \frac{MIN}{MAX-MIN}$$

$$V = MAX.$$

That is, the first color space conversion unit 202 can convert the input image into a HSV signal in which a human visual perception is considered through Equation 1.

The saturation enhancement unit 203 can enhance a saturation of the input image using a saturation value S and a brightness value V of the converted HSV value. Specifically, the saturation enhancement unit 203 can enhance the saturation of the input image using a saturation variation according to a brightness feature of the input image. In this instance, the brightness feature of the input image can be determined by the HSV value converted by the first color space conversion unit 202.

The saturation enhancement unit 203 can calculate the saturation variation depending on an average brightness value of the input image and a brightness value for each pixel of the input image. Also, the saturation enhancement unit 203 can enhance the saturation of the input image according to the calculated saturation variation. An operation of calculating the saturation variation is described in detail with reference to FIGS. 3 and 4.

The gray scale area protection unit 204 can determine a final saturation variation S' depending on a saturation value S of the input image and the saturation variation (ΔS), and prevent a saturation enhancement of a gray scale area. The saturation variation (ΔS) is determined by the saturation enhancement unit 203.

As described with reference to FIG. 1, when a saturation of the gray scale area is increased, a color noise included in the gray scale area can be amplified. Accordingly, the gray scale area protection unit 204 can prevent a saturation enhancement of the gray scale area having a low saturation, considering the saturation of the input image.

The gray scale area protection unit 204 can control and protect a potential gray scale area. As described in FIG. 1, the minute saturation value exists in the potential gray scale area, although the potential gray scale area is visually recognized as a gray scale area due to a difference of an RGB value of the input image.

The gray scale area can be determined by the saturation value S of the input image. The saturation value, which is used to determine the potential gray scale area, can vary due to a difference of a color reproduction system of various types of input/output color devices, a difference of the saturation enhancement defined by the saturation enhancement unit 203, and the like.

When the saturation enhancement is not applied to the potential gray scale area, the color noise is not generated. However, when the saturation enhancement is applied to the entire image to improve an image quality, the color noise included in the potential gray scale area can be amplified, which causes an adverse effect.

Accordingly, the gray scale area protection unit 204 needs to prevent the saturation enhancement from being applied by decreasing an application rate with respect to the saturation variation in the potential gray scale area. That is, the gray scale area protection unit 204 can increase the application rate with respect to the saturation variation as the saturation value of the input image increases, and decrease the application rate with respect to the saturation variation as the saturation value of the input image decreases.

The gray scale area protection unit 204 can determine a final saturation variation for enhancing the saturation of the input image through the above-described operation. The saturation of the input image where the final saturation variation is applied is represented as S' in FIG. 2.

An operation of determining the final saturation variation is described in detail with reference to FIG. 5.

The color control unit 205 can control a color of the input image using a color control gain value depending on a brightness feature of the input image.

A consistent color according to brightness may not be maintained due to a characteristic of a color device. Also, with respect to a color enhancement, when only saturation enhancement is applied, the saturation of the input image is often not enhanced, and also components of color can be changed. Accordingly, the color control unit 205 can control the color of the input image using the color control gain value depending on the brightness feature of the input image to prevent the color from being changed.

In this instance, the brightness feature of the input image can be determined by a brightness value for each pixel of the input image. Specifically, the color control unit 205 can control the color of the input image using an hue H and value V of a HSV value which is converted by the first color space conversion unit 202. Also, a value in which the color is controlled by the color control unit 205 corresponds to H' value of FIG. 2. The color control unit 205 can control the color by calculating a color variation in a same way as the above-described method of determining the saturation variation depending on a brightness value for each pixel. Specifically, the color variation depending on the brightness value for each pixel can be calculated using the color value of the input image and the color control gain value depending on the brightness value for each pixel of the input image.

In this instance, the color control gain value depending on the brightness value for each pixel of the input image can be determined as an output value using a color variation gain curve according to a color variation function. The output value corresponds to an input value which is the brightness value for each pixel.

The color control gain value depending on the brightness value for each pixel of the input image can be determined using a sampled LUT between predetermined threshold values in the color variation gain curve. Here, the color variation gain curve can vary depending on variables which are externally set.

An operation of determining the color control gain value is described in detail with reference to FIG. 4.

As illustrated in FIG. 2, a saturation value of the input image S', which is enhanced by the saturation enhancement unit 203 and the gray scale area protection unit 204, is derived from the input image having the converted HSV value. Also, a color value H', which is controlled by the color control unit 205, is derived from the input image having the converted HSV value.

Also, when the color control and saturation enhancement are performed, a brightness of the input image can be acquired as a resultant brightness value V' which is a changed brightness value. The present invention is to enhance the color of image through the color control and saturation enhancement, and thus preventing the change in the brightness value is needed. Accordingly, the changed brightness value needs to be corrected to revert back to the brightness value of the input image, by the brightness value correction unit 207.

The brightness value correction unit 207 needs to use a brightness value, that is, luminance Y, of a YCbCr color space in which human visual perception is considered as opposed to a HSV color where in which human visual perception is not considered. Accordingly, a HSV value is needed to be converted into the YCbCr color space. However, an operation of converting the HSV value into the YCbCr value is not simple, and thus the HSV value may be converted into the YCbCr value through two conversion methods described below.

An R'G'B' value, which is converted into an RGB color space value by the first color space conversion unit 202, is derived from a color-enhanced H'S'V' value. Also, the R'G'B' value can be converted into Y'Cb'Cr' value via a second color space conversion unit 206. Here, the second color space conversion unit 206 can perform a color space conversion between the RGB value and YCbCr value. That is, the HSV value can be converted into the YCbCr value via the first color space conversion unit 202 and the second color space conversion unit 206.

The second color space conversion unit 206 can convert the RGB value to the brightness value Y, which is represented as, $$Y = aR + bG + cB \qquad \text{[Equation 2]}$$

Here, a coefficient a, a coefficient b, and a coefficient c can vary according to a type of YCbCr signal.

The brightness value correction unit 207 can correct a difference between an input brightness value of the input image and a resultant brightness value in which the color control and saturation enhancement are applied. In this instance, the resultant brightness value can correspond to Y' of the Y'Cb'Cr' value which is obtained by converting the H'S'V' value through the first color space conversion unit 202 and the second color space conversion unit 206, that is, the two conversion operations.

Also, the input brightness value of the input image can correspond to Y of the YCbCr value which is obtained by converting the RGB value through the second color space conversion unit 206. The brightness value correction unit 207 can correct the difference between the input brightness value Y and the resultant brightness value Y' of the input image. Referring to FIG. 2, the corrected brightness value via the brightness value correction unit 207 is Y''.

Also, a corrected resultant value Y''Cb''Cr'' can be converted into an output image R''G''B'' via the second color space conversion unit 206. Accordingly, the apparatus 201 for enhancing color of image can maintain the brightness value of the input image and provide the output image in which the saturation and color are controlled.

Figure 3:
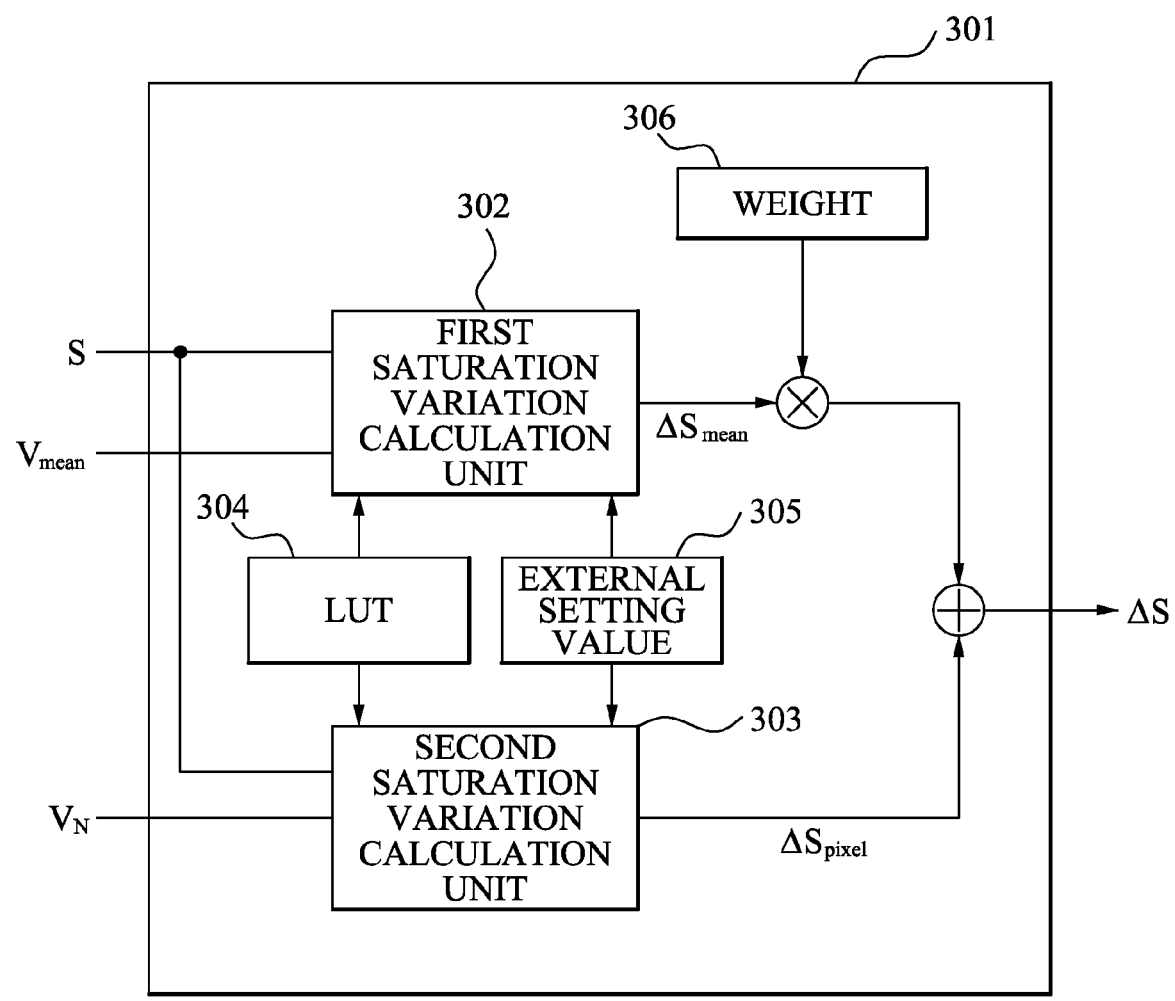
FIG. 3 illustrates an example of a saturation enhancement unit of FIG. 1.

FIG. 3 illustrates an example of the saturation enhancement unit 301 of FIG. 1.

Referring to FIG. 3, the saturation enhancement unit 301 includes a first saturation variation calculation unit 302 and a second saturation variation calculation unit 303.

The first saturation variation calculation unit 302 can calculate a saturation variation ($\Delta S_{mean}$) depending on an average brightness value of an input image. Specifically, the first saturation variation calculation unit 302 can calculate the saturation variation ($\Delta S_{mean}$) using a saturation value S of the input image and a saturation enhancement gain value $\alpha(V_{mean})$ depending on an average brightness value ($V_{mean}$) of the input image.

As an example, the saturation variation ($\Delta S_{mean}$) can be calculated by, $$\Delta S_{mean} = S \cdot \alpha(V_{mean}). \qquad \text{[Equation 3]}$$

Here, $\Delta S_{mean}$ is the saturation variation depending on the average brightness value, S is the saturation value of the input image, and $\alpha(V_{mean})$ is a saturation enhancement gain value depending on the average brightness value ($V_{mean}$) of the input image.

Also, for example, the average brightness value ($V_{mean}$) can be calculated by, $$V_{mean} = \frac{\omega_{n-2} \cdot V_{mean,n-2} + \omega_{n-1} \cdot V_{mean,n-1} + \omega_n \cdot V_{mean,n}}{N} \qquad \text{[Equation 4]}$$

$$N = \omega_{n-2} + \omega_{n-1} + \omega_n.$$

Here, in $\omega_{n-2}, \omega_{n-1}, \omega_n$ can indicate a current frame, n−1 can indicate a previous frame, and n−2 can indicate a previous frame of the previous frame. Also, ω can indicate a weight according to the average brightness value ($V_{mean}$). A number of previous frames excluding the current frame can be at least one, and is not limited to a predetermined number.

When a sudden scene change occurs or a brightness difference between adjacent frames is great, flickering can occur. The flickering can be reduced using an average brightness value of the current frame of the input image as well as an average brightness value of the previous frame. That is, a superior image can be generated by calculating the average brightness value of the current frame and the previous frame. The saturation enhancement gain value $\alpha(V_{mean})$ can be determined as an output value using a saturation variation gain curve according to a saturation variation function. The output value corresponds to an input value which is the average brightness value of the current frame.

Specifically, the saturation enhancement gain value $\alpha(V_{mean})$ can be determined using a sampled LUT 304 between a low brightness threshold value and a high brightness threshold value in the saturation variation gain curve.

In this instance, the LUT 304 with respect to an entire brightness value is used, a hardware embodiment can be complex, and thus the saturation enhancement gain value $\alpha(V_{mean})$ between the brightness threshold values can be determined using the sampled LUT 304.

The saturation variation gain curve can vary according to an external setting value 305 such as a brightness threshold value, a parameter, and a slope of the saturation variation function. For example, the saturation variation gain curve indicates that the saturation enhancement gain value which is the input value can increase as the average brightness value which is the input value increase, and the saturation enhancement gain value can decrease as the average brightness value decreases.

The second saturation variation calculation unit 303 can calculate a saturation variation ($\Delta S_{Pixel}$) using the saturation value of the input image and a saturation enhancement gain value depending on a brightness value for each pixel $V_i$ of the input image.

When the saturation variation ($\Delta S_{Pixel}$) is determined using the saturation enhancement gain value depending on the average brightness value of the input image, a local feature of the input image can not be taken into account. That is, when the saturation enhancement gain value is determined using only average brightness value, a saturation variation of a dark input image can be determined to be small due to a low gradation of the image.

However, even though the input image has a low gradation with a small average brightness value, a portion of the input image can have a great brightness value. In this instance, when the saturation enhancement is controlled by only the average brightness value, a saturation of a partial area of the input image having the great brightness value may not be increased.

Conversely, even though the input image has a high gradation with a great average brightness value, a portion of the input image can have a small brightness value. In this instance, the above-described disadvantage can arise.

Accordingly, an operation of enhancing the saturation depending on the average brightness value and an operation of enhancing the saturation depending on the brightness value for each pixel are needed. As illustrated in FIG. 3, when the first saturation variation calculation unit 302 and the second saturation variation calculation unit 303 are connected in parallel, the first saturation variation calculation unit 302 and the second saturation variation calculation unit 303 can perform the saturation enhancement, respectively.

The saturation variation gain value depending on the brightness value for each pixel $V_i$ of the input image can be determined in a similar way as performed in the first saturation variation calculation unit 302. For example, the saturation variation gain curve which is used in the second saturation variation calculation unit 303 indicates the saturation enhancement gain value, which is the output value, increases as the brightness value for each pixel which is the input value increases, and the saturation enhancement gain value decreases as the brightness value for each pixel decreases.

In this instance, when a bright area partially exists in an image in which the saturation enhancement is slightly applied due to a low average brightness value, the saturation enhancement depending on the brightness value for each pixel can be applied.

The saturation enhancement gain curve depending on the brightness value for each pixel and the average brightness value and the sampled LUT are described in detail with reference to FIG. 4.

The saturation enhancement unit 301 can enhance the saturation of the input image using the saturation variation ($\Delta S_{mean}$) depending on the average brightness value ($V_{mean}$) and the saturation variation ($\Delta S_{Pixel}$) according to the brightness value for each pixel $V_i$.

For example, the saturation enhancement unit 301 can determine a final saturation variation ($\Delta S$) using a weight 306 ($\omega'$) depending on a difference between the average brightness value ($V_{mean}$) and the brightness value for each pixel $V_i$. The final saturation variation ($\Delta S$) can be determined by, $$\Delta S = \Delta S'_{mean} + \Delta S_{pixel} \quad \text{[Equation 5]}$$

$$\Delta S'_{meann} = \omega' \cdot \Delta S_{mean}$$

$$\omega' = \begin{cases} \dfrac{-|V_i - V_{mean}|}{(255 - V_{mean})} + 1, & \text{if } V_{mean} \leq 128 \\ \dfrac{-|V_i - V_{mean}|}{V_{mean}} + 1, & \text{if } V_{mean} > 128 \end{cases}$$

Here, when the average brightness value ($V_{mean}$) is the same as the brightness value for each pixel $V_i$, the weight ($\omega'$) can be 1. Conversely, when a difference between the average brightness value ($V_{mean}$) and the brightness value for each pixel $V_i$ is great, the weight ($\omega'$) can be 0.

Accordingly, when the weight ($\omega'$) is 0, the saturation enhancement unit 301 can exclude the saturation variation ($\Delta S_{mean}$) depending on the average brightness value ($V_{mean}$). Conversely, when the weight ($\omega'$) is 1, the saturation enhancement unit 301 can maintain the saturation variation ($\Delta S_{mean}$) depending on the average brightness value ($V_{mean}$). When the weight ($\omega'$) is between 0 and 1, the saturation enhancement unit 301 can use a saturation variation ($\Delta S'_{mean}$) depending on an average brightness value in which the weight ($\omega'$) is applied through Equation 5.

Figure 4:
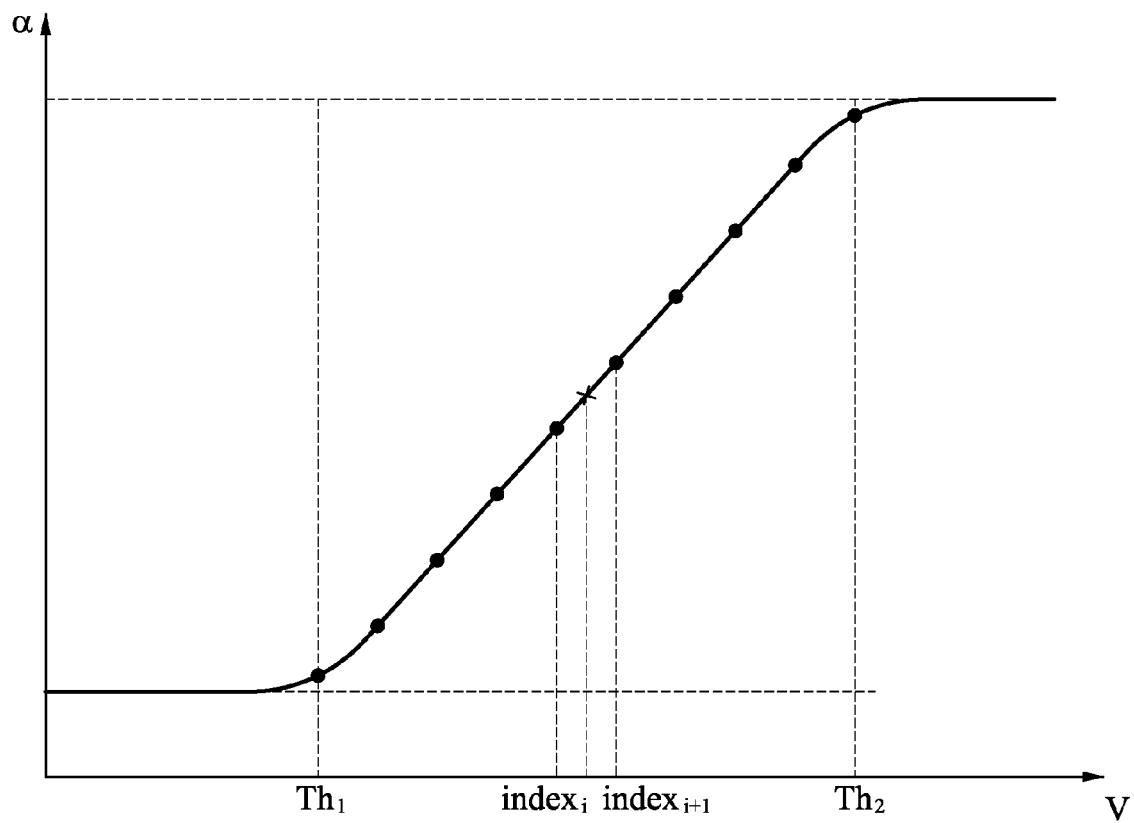
FIG. 4 illustrates a graph of a gain curve applied to a saturation enhancement unit and color control unit of FIG. 1.

FIG. 4 illustrates a graph of a gain curve applied to the saturation enhancement unit 102 and the color control unit 104 of FIG. 1.

Referring to FIG. 4, a saturation variation gain curve applied to the saturation enhancement unit and a color variation gain curve applied to the color control unit are illustrated. Shapes of the saturation variation gain curve and the color variation gain curve are in a S shape. Each curve can independently vary depending on an external setting value. Hereinafter, the saturation variation gain curve is described. A description of the color variation gain curve can be referred to as the description of the saturation variation gain value curve.

The saturation variation gain curve can be determined according to a saturation variation function. In this instance, the saturation variation function can vary according to the external setting value. Also, the external setting value can include a brightness threshold value, a parameter, and a slope of the saturation variation function. The saturation variation function can be determined by, $$\alpha(V_{mean}) =$$
$$\begin{cases} A \cdot (\text{Gain}[index_0] + B), & \text{if } V_{mean} < Th_1 \\ A \cdot (\text{Interpolate }(\text{Gain}[index_i] + \text{Gain}[index_{i+1}]) + B), & \text{if } Th_1 \le V_{mean} \le Th_2 \\ A \cdot (\text{Gain}[index_{max}] + B), & \text{if } V_{mean} \ge Th_2 \end{cases}$$

$$index_i = (V_{mean} - Th_1) \cdot \frac{N}{(Th_2 - Th_1)}.$$

[Equation 6]

Here, A indicates the slope of the saturation variation function, and B indicates the parameter. Also, $Th_1$ indicates a low brightness threshold value, and $Th_2$ indicates a high brightness threshold value.

In Equation 6, 'index' is a basic LUT value corresponding to an average brightness value of the image. N is a number of LUTs between the high brightness threshold value and the low brightness threshold value. The number of LUTs, N, can vary depending on a memory size of an application system.

As illustrated in FIG. 4, when the average brightness value is less than the low brightness threshold value, a LUT value can be set to a minimum value. Also, when the average brightness value is greater than the high brightness threshold value, the LUT value can be set to a maximum value.

For example, when the average brightness value is between the low brightness threshold value and the high brightness threshold value, a saturation enhancement gain value can be determined by interpolating a LUT value between $index_i$ and $index_{i+1}$.

In this instance, when the saturation variation gain curve is obtained using a LUT according to an entire average brightness value, a hardware embodiment can be complex. Accordingly, the saturation variation gain curve can be determined using a sampled LUT with respect to an area between the low brightness threshold value and the high brightness threshold value.

For example, the saturation variation gain value can be determined using a linear interpolation method using the LUT value between $index_i$ and $index_{i+1}$. Moreover, the saturation variation gain value can be determined using another interpolation method.

The saturation variation gain curve can be determined by varying the parameter and the slope of the saturation variation function. The saturation enhancement unit can enhance a saturation of an input image by determining a saturation enhancement gain value. The saturation enhancement gain value is an output value corresponding to an input value which is the average brightness value.

Figure 5:
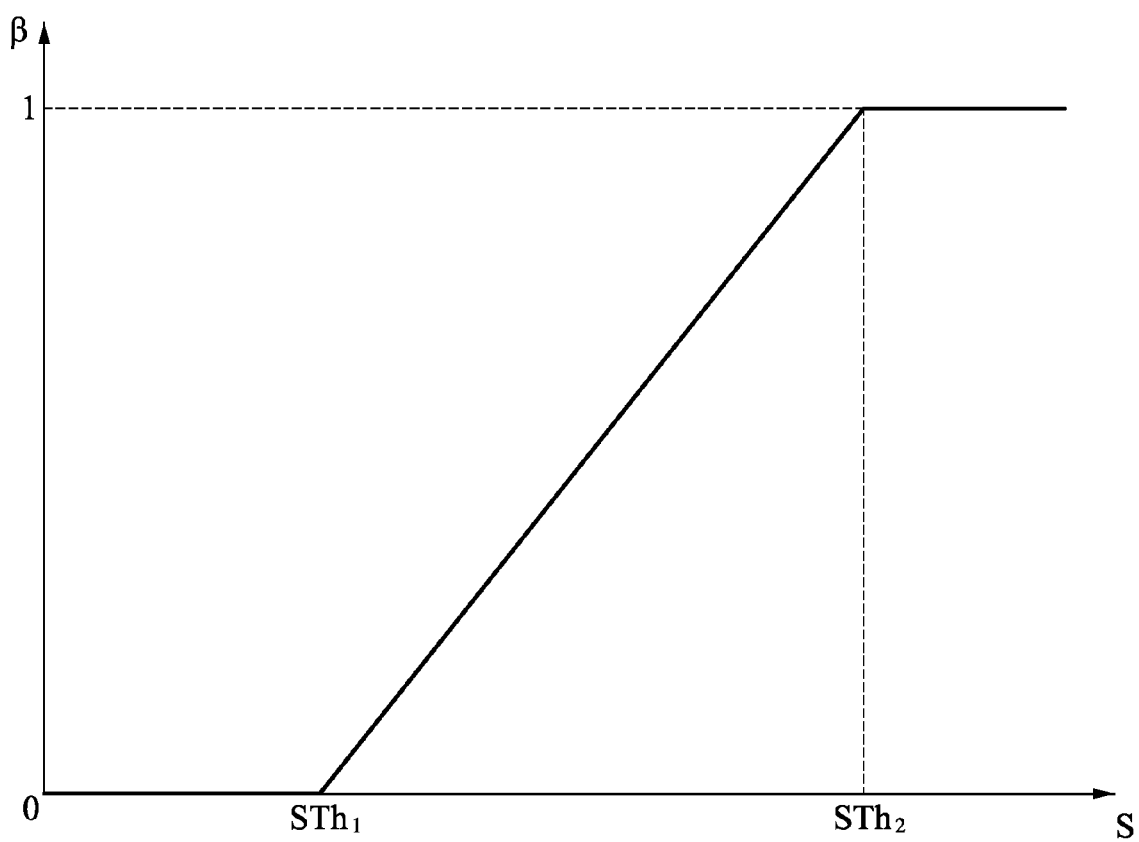
FIG. 5 illustrates a graph of a saturation variation application rate depending on a saturation of an input image applied to a gray scale area protection unit of FIG. 1.

FIG. 5 illustrates a graph of a saturation variation application rate depending on a saturation of an input image applied to the gray scale area protection unit 103 of FIG. 1.

As described with reference to FIGS. 1 and 2, the gray scale area protection unit does not protect a gray scale area. That is, the gray scale area protection unit can protect a "potential" gray scale area.

In this instance, although the potential gray scale area is visually recognized as a gray scale area, a small saturation value exists due to a minute difference of an RGB value, and thus the potential gray scale area can correspond to an area which is numerically not a gray color. A range of potential gray scale area can be controlled due to a difference of a color reproduction system of various types of color devices.

When a saturation enhancement of a gray scale area including a minute color noise is performed, the color noise can be amplified. For example, when an R value is 100, a G value is 95, and a B value is 105 with respect to a particular pixel, an S value of a converted HSV value becomes 0.09 (maximum standard 1).

When the S value becomes 0.9 by multiplying the saturation value by 10, the potential gray scale area is no longer seen as gray, and is recognized as being in colors. Accordingly, the gray scale area protection unit can prevent a saturation from being enhanced by decreasing an application rate of a saturation variation with respect to the gray scale area.

That is, the gray scale area protection unit can increase an application rate with respect to the saturation variation as a saturation value of the input image increases, and decrease the application rate with respect to the saturation variation as the saturation value of the input image decreases, which is illustrated in FIG. 5. The graph of FIG. 5 can be determined by, $$\beta(S) = \begin{cases} 0, & \text{if } S < STh_1 \\ \frac{S - STh_1}{STh_2 - STh_1}, & \text{if } STh_1 \le S < STh_2 \\ 1, & \text{if } S \ge STh_2 \end{cases}$$

[Equation 7]

In FIG. 5, $STh_1$ is set as a low saturation threshold value, and $STh_2$ is set as a high saturation threshold value. The gray scale area protection unit can set the application rate ($\beta$) with respect to the saturation variation as 0 when the saturation value of the input image is less than the low saturation threshold value $STh_1$. Also, the gray scale area protection unit can set the application rate ($\beta$) with respect to the saturation variation as 1 when the saturation value of the input image is greater than the high saturation threshold value $STh_2$.

Also, the gray scale area protection unit can control the application rate ($\beta$) with respect to the saturation variation to be gradually taken into account with respect to a saturation value between $STh_1$ and $STh_2$. That is, the saturation value between $STh_1$ and $STh_2$ can prevent a drastic saturation change in a successive gradation.

For example, the gray scale area protection unit can determine a final saturation variation, which is represented as, $$S' = S + (\Delta S \cdot \beta(S)).$$ [Equation 8]

Here, S indicates a saturation value of the input image, and $\beta(S)$ indicates the application rate with respect to the saturation variation. S' indicates the final saturation variation through the saturation enhancement unit and the gray scale area protection unit. Accordingly, the gray scale area protection unit can determine the final saturation variation using the saturation value of the input image and the saturation variation determined by the saturation enhancement unit.

Figure 6:
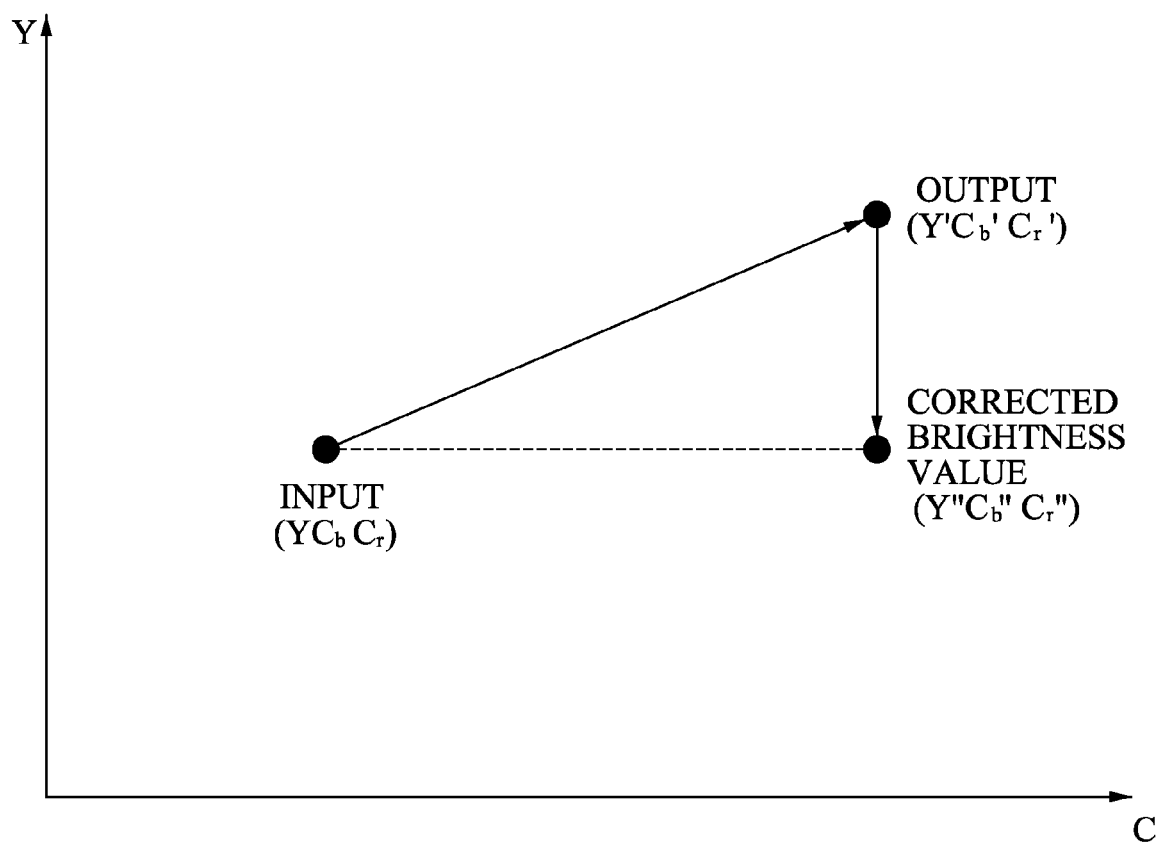
FIG. 6 illustrates an operation of correcting a difference between a resultant brightness value and an input brightness value of input image according to an embodiment of the present invention.

FIG. 6 illustrates an operation of correcting a difference between a resultant brightness value and an input brightness value of input image according to an embodiment of the present invention.

As described above, when a saturation enhancement and a color control is performed through a HSV color space, a brightness value of the input image can be additionally changed. However, the change of the brightness value of the input image is not necessary, and thus the changed brightness value of the input image needs to be corrected to revert back to the brightness value of the input image. Accordingly, a brightness value correction unit can correct the changed brightness value back to an original brightness value.

The brightness value correction unit can correct the brightness value using an input brightness value of the input image YCbCr and a resultant brightness value Y'Cb'Cr' in which a saturation enhancement and color control are applied, which is illustrated in FIG. 6.

For example, the brightness value correction unit can correct the brightness value, which is represented as, $$\Delta Y = Y - Y'$$

$$Y'' = Y' + \gamma \cdot \Delta Y \quad \text{[Equation 9]}$$

Here, $\Delta Y$ indicates a difference between the input brightness value of the input image Y and the resultant brightness value Y'. Y" indicates a final output brightness value after the correcting is performed. $\gamma$ indicates a brightness value correction between 0 and 1.

Accordingly, the brightness value correction unit corrects the resultant brightness value Y' to be the final output brightness value Y" which is the same as the input brightness value of the input image Y. However, the final output brightness value Y" may not be exactly the same as the input brightness value of the input image Y.

Figure 7:
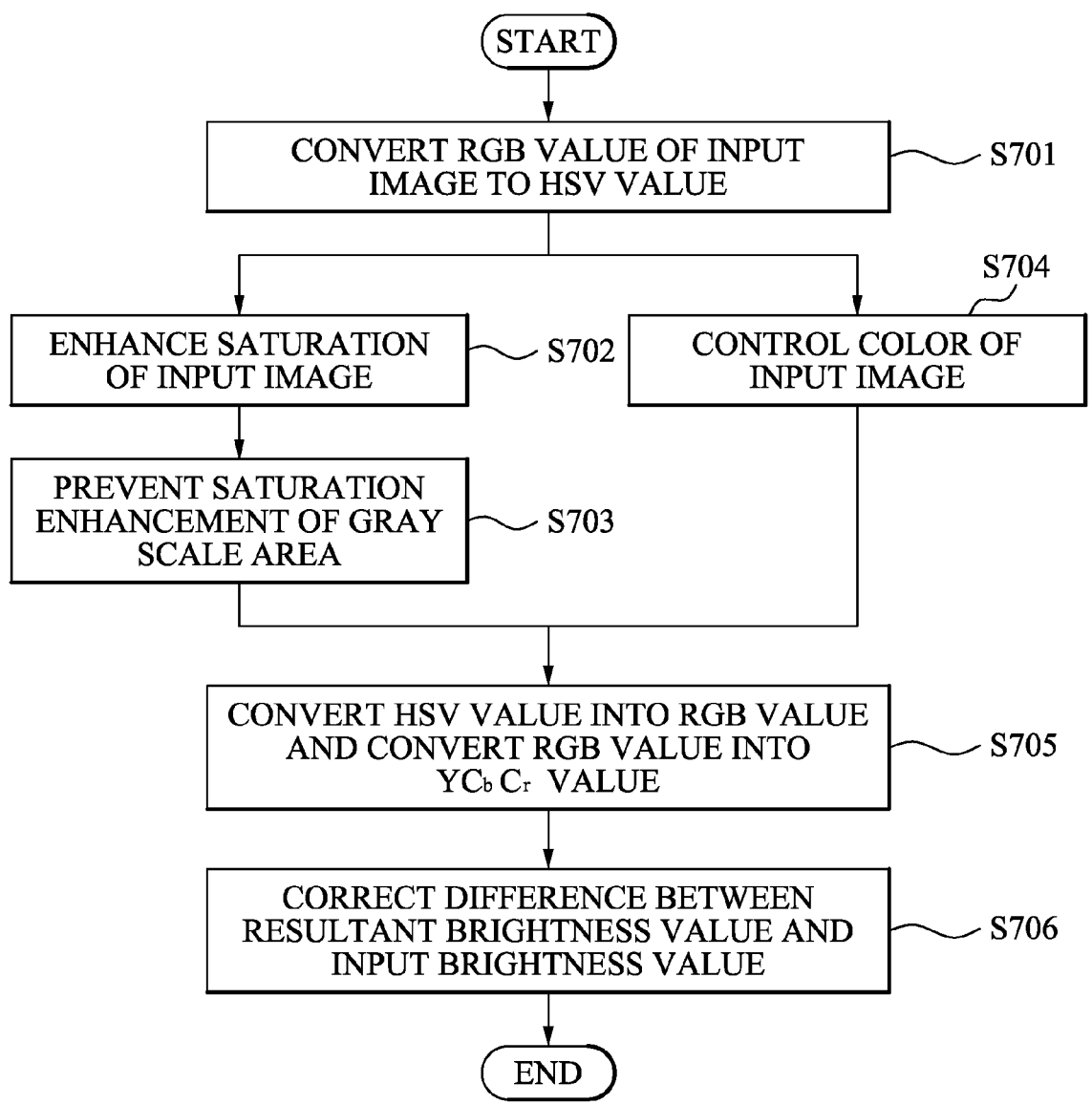
FIG. 7 illustrates a method of enhancing color of image according to an embodiment of the present invention.

FIG. 7 illustrates a method of enhancing color of an image according to an embodiment of the present invention.

Referring to FIG. 7, in operation S701, the method of enhancing color of an image converts an input image with an RGB value into an input image with an HSV value.

In operation S702, the method of enhancing color of an image enhances a saturation of the input image using a saturation variation according to a brightness feature of the input image.

In this instance, the brightness feature of the input image can be determined according to a HSV value which is obtained by converting the RGB value of the input image through a color space conversion.

Also, the enhancing in operation S702 can include an operation of calculating the saturation variation depending on an average brightness value of the input image and an operation of calculating the saturation variation depending on a brightness value for each pixel of the input image.

In this instance, the saturation variation depending on the average brightness value of the input image can be calculated using a saturation value of the input image and a saturation enhancement gain value depending on the average brightness value of the input image.

Also, the saturation enhancement gain value can be determined as an output value using a saturation variation gain curve according to a saturation variation function. The output value corresponds to an input value which is an average brightness value of a current frame.

In this instance, the average brightness value of the current frame can be determined using each average brightness value of at least one previous frame with respect to the current frame and a weight with respect to each of the average brightness values.

Also, the saturation variation gain curve can vary according to a brightness threshold value, a parameter, and a slope of the saturation variation function.

Also, the saturation enhancement gain value can be determined using a sampled LUT between a low brightness threshold value and a high brightness threshold value in the saturation variation gain value curve.

Also, the saturation variation depending on the brightness value for each pixel of the input image can be calculated using the saturation value of the input image and a saturation enhancement gain value depending on the brightness value for each pixel of the input image.

In this instance, the saturation enhancement gain value can be determined as an output value using the saturation variation gain curve according to the saturation variation function. The output value corresponds to an input value which is the brightness value for each pixel.

Also, in operation S702, the saturation of the input image can be increased using the saturation variation depending on the average brightness value and the saturation variation depending on the brightness value for each pixel by considering a weight according to a difference between the average brightness value and the brightness value for each pixel.

In this instance, the weight is 1 when the brightness value for each pixel is the same as the average brightness value, and the weight is 0 when the difference between the brightness value for each pixel and the average brightness value is great.

Also, in operation S702, when determining the saturation variation of the input image, the saturation variation depending on the average brightness value is maintained when the weight is 1, and the saturation variation depending on the average brightness value is excluded when the weight is 0.

In operation S703, the method of enhancing color of an image can prevent a saturation enhancement of a gray scale area.

In this instance, an application rate with respect to the saturation variation is increased as the saturation value of the input image increases, and the application rate with respect to the saturation variation is decreased as the saturation value of the input image decreases. Accordingly, a final saturation variation is determined in operation S703.

In operation S704, the method of enhancing color of an image can control a color of the input image using the brightness feature of the input image.

In this instance, a color variation can be calculated using a color value of the input image and a color control gain value depending on a brightness value for each pixel of the input image.

In operation S705, the method of enhancing color of an image can convert a resultant brightness value of a HSV value into an RGB value and then convert the converted RGB value into a YCbCr value.

In operation S706, the method of enhancing color of an image can correct a difference between a resultant brightness value and an input brightness value of the input image. The resultant brightness value is obtained by converting the HSV value into the YCbCr value via a conversion using the RGB value, and the input brightness value is obtained by converting the RGB value into the YCbCr value.

In this instance, a correction value obtained by the correcting can be outputted by converting the correction value into an RGB value.

Descriptions with respect to the method of enhancing color of image illustrated in FIG. 7 which are the same as the descriptions which have been used with reference to FIGS. 1 through 6 are omitted.

The above-described embodiments of the present invention can be recorded in computer-readable media including program instructions to implement various operations embodied by a computer. The media can also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that can be executed by the computer using an interpreter. The described hardware devices can be configured to act as one or more software modules in order to perform the operations of the above-described embodiments of the present invention.

According to an aspect of the present invention, an apparatus and method of enhancing color of image enhances a saturation depending on an average brightness value and a brightness value for each pixel of image, and thereby can take into account an entire feature and local feature of the image.

According to another aspect of the present invention, an apparatus and method of enhancing color of image controls a color depending on brightness value for each pixel, and thereby can maintain a color consistency.

According to another aspect of the present invention, an apparatus and method of enhancing color of image prevents a saturation increase of a gray scale area having low saturation, and thereby can reduce generation of low gradation noise.

According to another aspect of the present invention, an apparatus and method of enhancing color of image which corrects a brightness value which is generated by a saturation enhancement and color control, and thereby can precisely control only targeted saturation and color.

Although a few embodiments of the present invention have been shown and described, it would be appreciated by those skilled in the art that changes can be made to these embodiments without departing from the principles and spirit of the invention, the scope of which is defined by the claims and their equivalents.

What is claimed is:

1. An apparatus for enhancing color of image, comprising:
a saturation enhancement unit to enhance a saturation of an input image using a saturation variation according to a brightness feature of the input image, wherein the saturation enhancement unit comprising:
a first saturation variation calculation unit to calculate a saturation variation ($\Delta S_{mean}$) depending on an average brightness value of the input image; and
a second saturation variation calculation unit to calculate a saturation variation ($\Delta_{pixel}$) depending on a brightness value for each pixel of the input image;
a gray scale area protection unit to determine a final saturation variation depending on the saturation variation according to the brightness feature of the input image that is determined by a weighted sum between the $\Delta S_{mean}$ and the $\Delta S_{pixel}$, and to prevent a saturation enhancement of a gray scale area;
a color control unit to control a color of the input image using a color variation according to the brightness feature of the input image; and
a brightness value correction unit to correct a difference between a resultant brightness value and an input brightness value of the input image, the resultant brightness value being generated by applying the final saturation variation and the color variation to the input image.

2. The apparatus of claim 1, further comprising:
a first color space conversion unit to perform a color space conversion between a red, green, blue (RGB) value and a hue, saturation, value (HSV) value,
wherein the brightness feature of the input image is determined by the HSV value, the HSV value being obtained by converting an RGB value of the input image through the color space conversion.

3. The apparatus of claim 2, further comprising:
a second color space conversion unit to perform a color space conversion between an RGB value and an YCbCr value.

4. The apparatus of claim 3, wherein the brightness value correction unit corrects the difference between the resultant brightness value and the input brightness value of the input image, the resultant brightness value being obtained by converting the HSV value into the YCbCr value through the first color space conversion unit and the second color space conversion unit, and the input brightness value of the input image being obtained by converting the RGB value into the YCbCr value through the second color space conversion unit.

5. The apparatus of claim 4, wherein the brightness value correction unit converts a correction value into the RGB value through the second color space conversion unit, and outputs the correction value, the correction value being obtained by correcting the difference between the resultant brightness value and the input brightness value of the input image.

6. The apparatus of claim 1, wherein the first saturation variation calculation unit calculates the saturation variation ($\Delta S_{mean}$) using a saturation value (S) of the input image and a saturation enhancement gain value depending on the average brightness value of the input image, and the saturation enhancement gain value is determined as an output value using a saturation variation gain curve according to a saturation variation function, the output value corresponding to an input value which is an average brightness value of a current frame.

7. The apparatus of claim 6, wherein the saturation variation gain curve varies according to a brightness threshold value, a parameter, and a slope of the saturation variation function, and the saturation enhancement gain value is determined using a sampled look up table (LUT) between a low brightness threshold value and a high brightness threshold value in the saturation variation gain curve.

8. The apparatus of claim 6, wherein the average brightness value of the current frame is determined using each average brightness value of at least one previous frame with respect to the current frame and a weight with respect to each of the average brightness values.

9. The apparatus of claim 1, wherein the second saturation variation calculation unit calculates the saturation variation ($\Delta S_{pixel}$) using a saturation value (S) of the input image and a saturation enhancement gain value depending on the brightness value for each pixel of the input image, and the saturation enhancement gain value is determined as an output value using a saturation variation gain curve according to a saturation variation function, the output value corresponding to an input value which is the brightness value for each pixel.

10. The apparatus of claim 1, wherein the saturation enhancement unit enhances the saturation of the input image using the saturation variation ($\Delta S_{mean}$) depending on the average brightness value and the saturation variation ($\Delta S_{pixel}$) depending on the brightness value for each pixel, by considering a weight depending on a difference between the average brightness value and the brightness value for each pixel.

11. The apparatus of claim 10, wherein the weight is 1 when the brightness value for each pixel is the same as the average brightness value, and the weight is 0 when the difference between the brightness value for each pixel and the average brightness value is great.

12. The apparatus of claim 11, wherein, when enhancing the saturation of the input image, the saturation enhancement unit maintains the saturation variation ($\Delta S_{mean}$) depending on the average brightness value when the weight is 1, and excludes the saturation variation ($\Delta S_{mean}$) depending on the average brightness value when the weight is 0.

13. The apparatus of claim 1, wherein the gray scale area protection unit determines the final saturation variation by increasing an application rate with respect to the saturation variation according to the brightness feature of the input image when a saturation value (S) of the input image is greater, and decreasing the application rate with respect to the saturation variation according to the brightness feature of the input image when the saturation value (S) of the input image is smaller.

14. The apparatus of claim 1, wherein the color control unit calculates the color variation using a color value of the input image and a color control gain value depending on a brightness value for each pixel of the input image, and the color control gain value is determined as an output value using a color variation gain curve according to a color variation function, the output value corresponding to an input value which is the brightness value for each pixel.

15. The apparatus of claim 14, wherein the color variation gain curve indicates the color control gain value, which is the output value, is smaller when the brightness value for each pixel is greater, and the color control gain value is greater when the brightness value for each pixel is smaller.

16. The apparatus of claim 14, wherein the color variation gain curve varies depending on a brightness threshold value, a parameter, and a slope of the color variation function, and the color control gain value is determined using a sampled LUT between a low brightness threshold value and a high brightness threshold value in the color variation gain curve.

17. A method of enhancing color of image, comprising:
enhancing a saturation of an input image using a saturation variation according to a brightness feature of the input image, wherein the enhancing the saturation of the input image comprising:
calculating a saturation variation ($\Delta S_{mean}$) depending on an average brightness value of the input image; and
calculating a saturation variation ($\Delta_{pixel}$) depending on a brightness value for each pixel of the input image;
determining a final saturation variation depending on the saturation variation according to the brightness feature of the input image that is determined by a weighted sum between the $\Delta S_{mean}$ and the $\Delta S_{pixel}$, and preventing a saturation enhancement of a gray scale area;
controlling a color of the input image using a color variation according to the brightness feature of the input image; and
correcting a difference between a resultant brightness value and an input brightness value of the input image, the resultant brightness value being generated by applying the final saturation variation and the color variation to the input image.

18. The method of claim 17, further comprising:
performing a color space conversion between a Red, Green, Blue (RGB) value and a Hue, Saturation, Value (HSV) value,
wherein the brightness feature of the input image is determined by the HSV value, the HSV value being obtained by converting an RGB value of the input image through the color space conversion.

19. The method of claim 18, further comprising:
performing a color space conversion between an RGB value and an YCbCr value.

20. The method of claim 19, wherein the correcting of the difference corrects the difference between the resultant brightness value and the input brightness value of the input image, the resultant brightness value being obtained by converting the HSV value into the YCbCr value through an RGB value, and the input brightness value of the input image being obtained by converting the RGB value into the YCbCr value.

21. The method of claim 20, wherein the correcting of the difference converts a correction value into the RGB value, and outputs the correction value, the correction value being obtained by correcting the difference between the resultant brightness value and the input brightness value of the input image.

22. The method of claim 17, wherein the calculating of the saturation variation depending on the average brightness value calculates the saturation variation ($\Delta S_{mean}$) using a saturation value (S) of the input image and a saturation enhancement gain value depending on the average brightness value of the input image, and the saturation enhancement gain value is determined as an output value using a saturation variation gain curve according to a saturation variation function, the output value corresponding to an input value which is an average brightness value of a current frame.

23. The method of claim 22, wherein the saturation variation gain curve indicates the saturation enhancement gain value, which is the output value, is greater when the average brightness value for each pixel, which is the input value, is greater, and the saturation enhancement gain value is smaller when the average brightness value for each pixel is smaller.

24. The method of claim 23, wherein the saturation variation gain curve varies according to a brightness threshold value, a parameter, and a slope of the saturation variation function, and the saturation enhancement gain value is determined using a sampled look up table (LUT) between a low brightness threshold value and a high brightness threshold value in the saturation variation gain curve.

25. The method of claim 22, wherein the average brightness value of the current frame is determined using each average brightness value of at least one previous frame with respect to the current frame and a weight with respect to each of the average brightness values.

26. The method of claim 17, wherein the calculating of the saturation variation ($\Delta S_{pixel}$) depending on the brightness value for each pixel of the input image calculates the saturation variation ($\Delta S_{pixel}$) using a saturation value (S) of the input image and a saturation enhancement gain value depending on the brightness value for each pixel of the input image, and the saturation enhancement gain value is determined as an output value using a saturation variation gain curve according to a saturation variation function, the output value corresponding to an input value which is the brightness value for each pixel.

27. The method of claim 17, wherein the enhancing of the saturation of the input image enhances the saturation of the input image using the saturation variation ($\Delta S_{mean}$) depending on the average brightness value and the saturation variation ($\Delta S_{pixel}$) depending on the brightness value for each pixel, by considering a weight depending on a difference between the average brightness value and the brightness value for each pixel.

28. The method of claim 27, wherein the weight is 1 when the brightness value for each pixel is the same as the average brightness value, and the weight is 0 when the difference between the brightness value for each pixel and the average brightness value is great.

29. The method of claim 28, wherein, when enhancing the saturation of the input image, the enhancing of the saturation of the input image maintains the saturation variation ($\Delta S_{mean}$) depending on the average brightness value when the weight is 1, and excludes the saturation variation ($\Delta S_{mean}$) depending on the average brightness value when the weight is 0.

30. The method of claim 17, wherein the preventing of the saturation enhancement of the gray scale area determines the final saturation variation by increasing an application rate with respect to the saturation variation according to the brightness feature of the input image when a saturation value (S) of the input image is greater, and decreasing the application rate with respect to the saturation variation according to the brightness feature of the input image when the saturation value (S) of the input image is smaller.

31. The method of claim 17, wherein the controlling of the color of the input image calculates the color variation using a color value of the input image and a color control gain value depending on a brightness value for each pixel of the input image, and the color control gain value is determined as an output value using a color variation gain curve according to a color variation function, the output value corresponding to an input value which is the brightness value for each pixel.

32. The method of claim 31, wherein the color variation gain curve varies depending on a brightness threshold value, a parameter, and a slope of the color variation function, and the color control gain value is determined using a sampled look up table (LUT) between a low brightness threshold value and a high brightness threshold value in the color variation gain curve.

33. A non-transitory computer-readable recording medium storing a program for executing a method of enhancing color of image, comprising:
- enhancing a saturation of an input image using a saturation variation according to a brightness feature of the input image, wherein the enhancing of the saturation of the input image comprising:
  - calculating a saturation variation ($\Delta S_{mean}$) depending on an average brightness value of the input image; and
  - calculating a saturation variation ($\Delta S_{pixel}$) depending on a brightness value for each pixel of the input image;
- determining a final saturation variation depending on the saturation variation according to the brightness feature of the input image that is determined by a weighted sum between the $\Delta S_{mean}$ and the $\Delta S_{pixel}$, and preventing a saturation enhancement of a gray scale area;
- controlling a color of the input image using a color variation according to the brightness feature of the input image; and
- correcting a difference between a resultant brightness value and an input brightness value of the input image, the resultant brightness value being generated by applying the final saturation variation and the color variation to the input image.

* * * * *

UNITED STATES PATENT AND TRADEMARK OFFICE
CERTIFICATE OF CORRECTION

PATENT NO. : 8,111,915 B2  Page 1 of 1
APPLICATION NO. : 11/877884
DATED : February 7, 2012
INVENTOR(S) : Yang Ho Cho et al.

It is certified that error appears in the above-identified patent and that said Letters Patent is hereby corrected as shown below:

Column 17, Line 14, In Claim 11, delete "great." and insert -- greater. --, therefor.

Column 19, Line 11 (Approx.), In Claim 28, delete "great." and insert -- greater. --, therefor.

Signed and Sealed this
Twenty-ninth Day of May, 2012

David J. Kappos
*Director of the United States Patent and Trademark Office*